FELIX CHILLINGWORTH, OF SPRINGFIELD, MASSACHUSETTS.

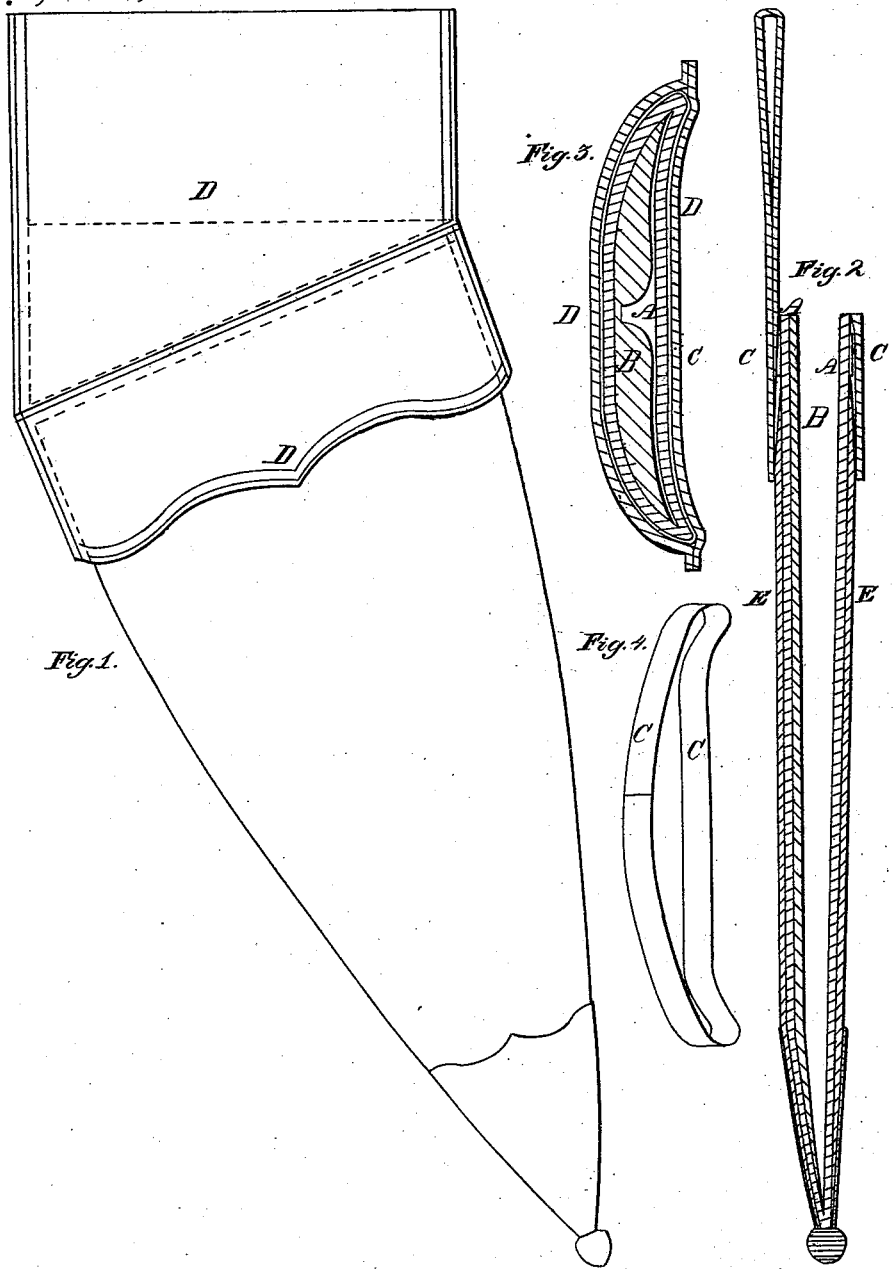

Letters Patent No. 84,612, dated December 1, 1868.

IMPROVED SCABBARD FOR TROWEL-BAYONET.

The Schedule referred to in these Letters Patent and making part of the same.

*To all whom it may concern:*

Be it known that I, FELIX CHILLINGWORTH, of the city of Springfield, in the county of Hampden, in the State of Massachusetts, have invented a Scabbard for Trowel-Bayonet; and I hereby declare that the following is a full and exact description thereof, reference being had to the accompanying drawings, and to the letters of reference marked thereon.

The nature of my invention consists in providing a scabbard for trowel-bayonets.

To enable others skilled in the art to make and use my invention, I will proceed to describe its construction.

I stitch the body of the scabbard, A, shape it on a form, put in the lining, B, which has a groove to receive the rib of the bayonet.

The spring C is placed between the frog D and body A, (and can be seen by raising point of frog, at D,) for the purpose of closing the mouth of the scabbard automatically, to exclude rain and snow.

The patent leather E is ball-stitched over the body A.

The frog D is so shaped as to give the scabbard the proper angle when on the belt.

What I claim as my invention, and desire to secure by Letters Patent, is—

A scabbard for trowel-shaped bayonets, constructed and arranged as described.

FELIX CHILLINGWORTH.

Witnesses:
W. G. CHAMBERLAIN,
J. G. FLAGG.